United States Patent
Qian

(10) Patent No.: US 12,194,649 B2
(45) Date of Patent: Jan. 14, 2025

(54) SAFE HAND-PULLED VEGETABLE CUTTER

(71) Applicant: CHANGZHOU INFINITE LIFE ELECTRONIC COMMERCE CO., LTD., Changzhou (CN)

(72) Inventor: Yufeng Qian, Changzhou (CN)

(73) Assignee: CHANGZHOU INFINITE LIFE ELECTRONIC COMMERCE CO., LTD., Changzhou (CN)

( * ) Notice: Subject to any disclaimer, the term of this patent is extended or adjusted under 35 U.S.C. 154(b) by 283 days.

(21) Appl. No.: 17/293,848

(22) PCT Filed: Oct. 23, 2019

(86) PCT No.: PCT/CN2019/112646
§ 371 (c)(1),
(2) Date: May 13, 2021

(87) PCT Pub. No.: WO2020/098458
PCT Pub. Date: May 22, 2020

(65) Prior Publication Data
US 2022/0009116 A1    Jan. 13, 2022

(30) Foreign Application Priority Data
Nov. 14, 2018 (CN) .......................... 201821871614.7

(51) Int. Cl.
*B26D 5/10* (2006.01)
*A47J 43/044* (2006.01)
(Continued)

(52) U.S. Cl.
CPC .............. *B26D 5/10* (2013.01); *A47J 43/044* (2013.01); *A47J 43/082* (2013.01); *B26D 1/28* (2013.01);
(Continued)

(58) Field of Classification Search
CPC .......... B26D 5/10; B26D 1/28; B26D 7/2614; B26D 2210/02; A47J 43/044; A47J 43/082
See application file for complete search history.

(56) References Cited

U.S. PATENT DOCUMENTS 5,996,483 A * 12/1999 Yip ........................ A47J 17/02
                                                        99/623
7,264,189 B2 * 9/2007 Holcomb ................ A47J 42/24
                                                        241/101.1
(Continued)

FOREIGN PATENT DOCUMENTS

CN    201572664 U  *  9/2010
CN    105212789 A      1/2016
(Continued)

*Primary Examiner* — Jonathan G Riley
(74) *Attorney, Agent, or Firm* — Muncy, Geissler, Olds & Lowe, P.C.

(57) ABSTRACT

Disclosed is a safe hand-pulled vegetable chopper, which relates to the field of food processing tools. The vegetable chopper herein includes a cup body, a lid matched with the cup body, a puller cord driving member in the lid, and a blade assembly in the cup body and detachably connected with a driving end of the puller cord driving member, a circular skirt-like enclosure is provided from a bottom of the lid around an outer periphery of the blade assembly for shielding the blade assembly, the skirt-like enclosure is on an inner side of the cup body when the cup body engages the lid, and the blade assembly stays on the lid when the cup body and the lid are separated.

7 Claims, 3 Drawing Sheets

(51) Int. Cl.
*A47J 43/08* (2006.01)
*B26D 1/28* (2006.01)
*B26D 7/26* (2006.01)

(52) U.S. Cl.
CPC ........ *B26D 7/2614* (2013.01); *B26D 2210/02* (2013.01)

(56) References Cited

U.S. PATENT DOCUMENTS

| | | | | |
|---|---|---|---|---|
| 8,635,948 | B2 * | 1/2014 | Herren | A47J 43/046 241/199.2 |
| 2006/0169810 | A1 | 8/2006 | Holcomb et al. | |
| 2008/0164357 | A1 * | 7/2008 | Chau | B26D 5/10 241/285.2 |
| 2009/0320696 | A1 * | 12/2009 | Herren | A47J 43/105 99/493 |
| 2018/0116463 | A1 * | 5/2018 | Reinhard | A47J 43/0716 |

FOREIGN PATENT DOCUMENTS

| | | | |
|---|---|---|---|
| CN | 105665090 | A | 6/2016 |
| CN | 205833286 | U | 12/2016 |
| CN | 207155929 | U * | 3/2018 |
| CN | 209050818 | U | 7/2019 |
| CN | 213133443 | U * | 5/2021 |

\* cited by examiner

SAFE HAND-PULLED VEGETABLE CUTTER

TECHNICAL FIELD

The present disclosure relates to a vegetable chopper, and more particularly, to a safe hand-pulled vegetable chopper.

BACKGROUND ART

At present, most of the common manual vegetable choppers in the market are operated by rotating a crank manually or scraping ingredients against a blade reciprocatively. These vegetable choppers are simple and easy to use but have disadvantages such as low efficiency and laborious operation. To overcome the shortcomings of the above-mentioned vegetable choppers, a hand-pulled vegetable chopper is also available in the market, such as the one disclosed in the Chinese patent No. ZL200920311434.8, granted on Sep. 8, 2010, titled "A Puller Cord Vegetable Chopper", and relating to a puller cord vegetable chopper that includes a container, a lid assembly that covers the container, and a blade mount assembly connected to the lid assembly; wherein the lid assembly has a lid, a puller cord rewinding member, a speed-increasing gear train connected to the puller cord rewinding member, and a one-way output member connected to the speed-increasing gear train; the blade mount assembly includes a blade mount, and blades mounted on the blade mount. With such a puller cord vegetable chopper, a user can pull the cord to drive the blade to rotate and chop the ingredients, which is labor-saving and efficient.

The hand-pulled vegetable chopper has been widely favored by consumers in recent years because of its advantages of being labor-saving and efficient. Those skilled in the art have also optimized the "hand-pulled vegetable chopper". For example, the Chinese patent No. ZL201620729905.7 discloses a "Hand-pulled Rotary Chopper", where a novel one-way output member is provided to replace that of the old one, and a hand-pulled transmission member of the vegetable chopper is simplified. The Chinese patent application No. 201610090733.8 discloses a "Double-chamber Food Processor Driven by Puller Cord", where two chopping chambers are provided as an upgrade based on the old one, which solves the problem of the existing puller cord food processor that only one kind of food or a mixture of several foods can be processed but two separate foods cannot be processed at the same time. The Chinese patent No. ZL201721240776.6 discloses a "Manual Vegetable Chopper", where a gear structure is used to drive the cord to chop food, which requires a gentler force and reduces the friction among parts in the entire internal rotatory structure, labor-saving and efficient, and greatly avoids jamming the cord.

However, the blade assembly of the hand-pulled vegetable chopper in the prior art stays in the cup body after the lid is opened, the user has to remove the blade assembly before taking out ingredients or cleaning the cup body, it's thus very likely for the user to contact the blade and get hurt, and it's found that these accidents often occur, which constitutes a severe safety issue; moreover, because the blade assembly stays in the cup body, it's difficult for a user to align the blade assembly and the lid when assembling the vegetable chopper, which can be troublesome. No effective solution has been found yet to the above-mentioned safety and assembly problems.

SUMMARY OF THE INVENTION

1. Technical Problems to be Solved

It is an object of the present disclosure to overcome the defects such as poor use safety and troublesome assembly of the hand-pulled vegetable chopper in the prior art by providing a safe hand-pulled vegetable chopper. According to the technical solution herein, a blade assembly is detachably connected with a driving end of a puller cord driving member, and a circular skirt-like enclosure is provided from a bottom of a lid and around an outer periphery of the blade assembly to shield the blade assembly, as such, after the vegetable chopper is opened, the blade assembly stays on one side of the lid and is shielded by the skirt-like enclosure, a user is less likely to contact the blade, and the safety of the vegetable chopper is improved; in use, the user can directly place the solid ingredients into an interior of the lid enclosed by the skirt-like enclosure, and then assemble the cup body on the lid, so that it is more convenient to assemble the vegetable chopper, safer to operate in the vegetable chopping process, and easy to clean the vegetable chopper; besides, the blade assembly is attracted on the lid magnetically, which facilitates the assembling and disassembling of the blade assembly.

2. Technical Solution

To achieve the object, the technical solution provided herein is as follows.

The safe hand-pulled vegetable chopper according to the present disclosure, including a cup body, a lid matched with the cup body, a puller cord driving member in the lid, and a blade assembly in the cup body and detachably connected with a driving end of the puller cord driving member, characterized in that a circular skirt-like enclosure is provided from a bottom of the lid around an outer periphery of the blade assembly shielding the blade assembly, the skirt-like enclosure is on an inner side of the cup body when the cup body engages the lid and the blade assembly stays on the lid when the cup body and the lid are separated.

Furthermore, a plurality of splines are further provided on an inner side of the skirt-like enclosure.

Furthermore, the skirt-like enclosure is attached to an inner sidewall of the cup body, and a plurality of notches are provided on the skirt-like enclosure at intervals.

Furthermore, the splines are arranged on the same sides of opening walls of the notches, and each notch is semi-closed by a stopper edge at a top.

Furthermore, snap slots are further provided on an outer sidewall of the skirt-like enclosure, snap fasteners matched with the snap slots are provided on the inner sidewall of the cup body, and the snap fastener is snapped into the snap slot by rotating the skirt-like enclosure relative to the cup body.

Furthermore, the blade assembly is attracted to the driving end of the puller cord driving member magnetically.

Furthermore, the blade assembly comprises a blade mount and blades mounted on the blade mount, an upper end of the blade mount is provided with a jack for a plug-in transmission connection with the driving end of the puller cord driving member, and a lower end of the blade mount is provided with a positioning hole to cooperate with a positioning column at a bottom of the cup body.

Furthermore, the lid comprises an upper lid and a lower lid at a bottom of the upper lid, and the skirt-like enclosure is integrally formed at a bottom of the lower lid.

Furthermore, the puller cord driving member is provided in a cavity formed by the upper lid and the lower lid, and comprises a torsion spring, a cord reel, pawls and, a ratchet gear wheel; the cord reel is sleeved on a central column of the upper lid, a puller cord is provided in a middle cord groove of the cord reel, one end of the puller cord is connected to a handle on an outer side of the lid, the torsion spring is disposed at an upper part of the cord reel, the pawls are disposed at a lower part of the cord reel, the pawls are matched with the ratchet gear disc arranged on the lower lid, and a connecting column penetrating through the lower lid is provided in a center of the ratchet gear wheel.

Furthermore, the connecting column is internally provided with a magnetic block for attracting a ferromagnetic component in the jack.

3. Advantageous Effects

The technical herein is more advantageous than the prior art in that:
(1) in the safe hand-pulled vegetable chopper herein, the blade assembly is detachably connected with the driving end of the puller cord driving member, and a circular skirt-like enclosure is provided from the bottom of the lid and around the outer periphery of the blade assembly to shield the blade assembly, as such, after the vegetable chopper is opened, the blade assembly stays on one side of the lid and is shielded by the skirt-like enclosure, the user is less likely to contact the blade, and the safety of the vegetable chopper is improved; in use, the user can directly place the solid ingredients into the interior of the lid enclosed by the skirt-like enclosure, and then assemble the cup body on the lid, so that it is more convenient to assemble the vegetable chopper, safer to operate in the vegetable chopping process, and easy to clean the vegetable chopper;
(2) in the safe hand-pulled vegetable chopper herein, a plurality of splines are further provided on an inner side of the skirt-like enclosure to effectively prevented ingredients from rotating along with the blades, so that the efficiency of the vegetable chopper is improved;
(3) in the safe hand-pulled vegetable chopper herein, the skirt-like enclosure is attached to an inner sidewall of the cup body, and a plurality of notches are provided on the skirt-like enclosure at intervals, as such, if the cup body is transparent, to which a degree the ingredients are being chopped can be observed through the notches, and the convenience in use is improved;
(4) in the safe hand-pulled vegetable chopper herein, the splines are arranged on the same sides of opening walls of the notches, which not only facilitates the forming of the splines on the skirt-like enclosure, but reinforces the effect of stopping rotating along with the blades by the splines with the help of the opening walls of the notches, hence the efficiency of chopping is improved; besides, the notch is semi-closed by the stopper edge at the top of the skirt-like enclosure, and the notch is open at the bottom, as such, small-grain ingredients can be prevented from leaking out of the notch when ingredients are fed into the skirt-like enclosure, and space can be reserved to observe to which a degree the ingredients are being chopped, thereby enabling a more flexible and convenient user experience;
(5) in the safe hand-pulled vegetable chopper herein, snap slots are further provided on an outer sidewall of the skirt-like enclosure, snap fasteners matched with the snap slots are provided on the inner sidewall of the cup body, and the snap fastener is snapped into the snap slot by rotating the skirt-like enclosure relative to the cup body, as such, it's easy and convenient to assemble and disassemble the cup body and the lid of the vegetable chopper; and
(6) in the safe hand-pulled vegetable chopper herein, the blade assembly is attracted onto the driving end of the puller cord driving member magnetically, so that the blade assembly can stay on one side of the lid after the vegetable chopper is opened, the chopped ingredients in the cup body can be directly taken out without removing the blade assembly first, and the blade assembly is fixed magnetically, which facilitates the assembling and disassembling.

Figure 1:
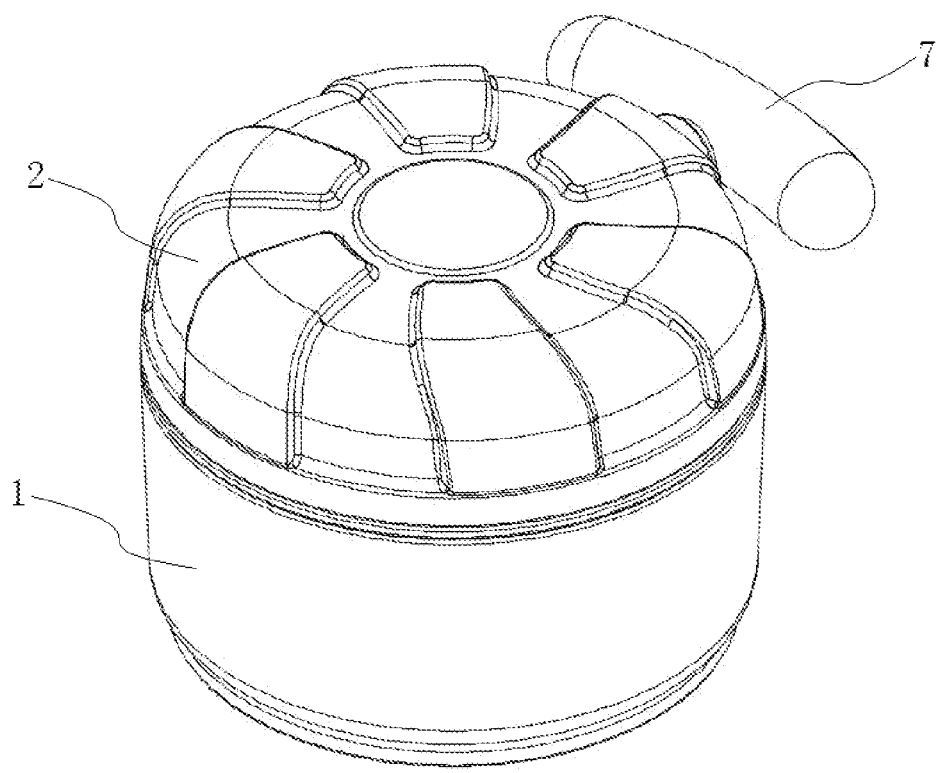
FIG. 1 is a schematic structural view of a safe hand-pulled vegetable chopper of the present disclosure.

List of reference signs in the accompanying drawings:
1. cup body; 1-1. positioning column; 1-2. anti-slip pad; 1-3. snap fastener; 2. lid; 2-1. upper lid; 2-2. lower lid; 3. puller cord driving member; 3-1. torsion spring; 3-2. cord reel; 3-2-1. mounting pin; 3-3. pawl; 3-4. ratchet gear wheel; 3-4-1. connecting column; 4. blade assembly; 4-1. blade mount; 4-1-1. jack; 4-1-2. positioning hole; 4-2. blade; 5. skirt-like enclosure; 5-1. notch; 5-2. stopper edge; 5-3. snap slot; 5-4. spline; 6. magnetic block; 7. handle.

DETAILED DESCRIPTION OF THE EMBODIMENTS

A detailed description of the present disclosure is provided with reference to the accompanying drawings and examples to facilitate the understanding of the present disclosure.

Examples

Figure 2:
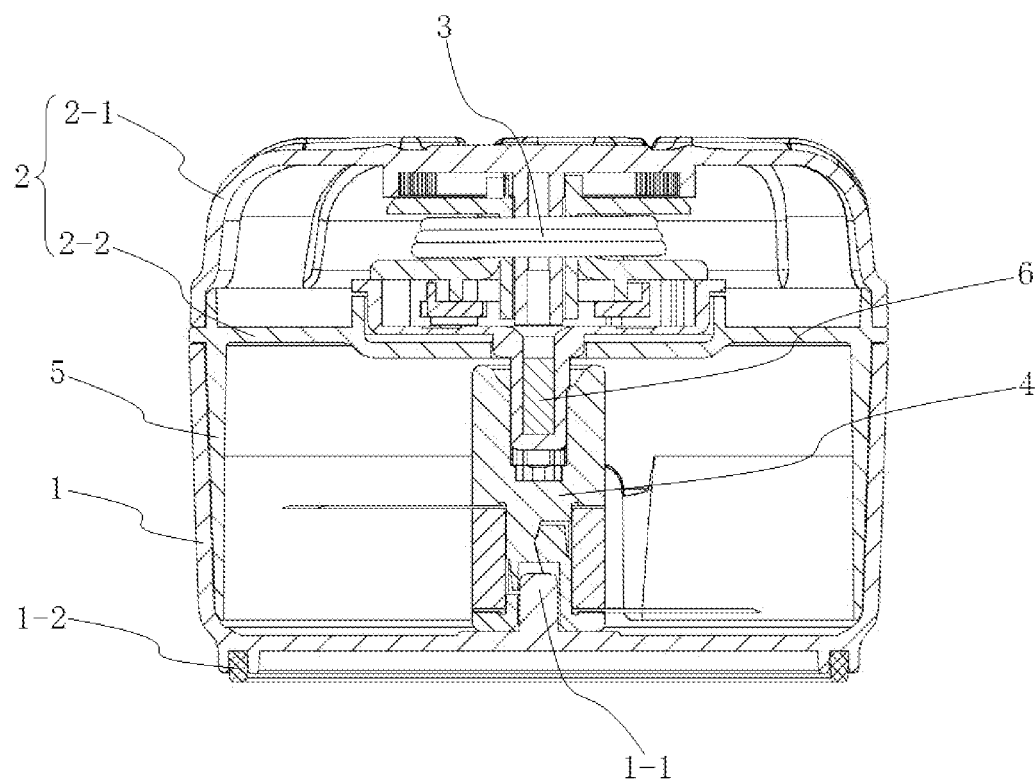
FIG. 2 is a schematic sectional view showing a structure of the safe hand-pulled vegetable chopper of the present disclosure.
Figure 3:
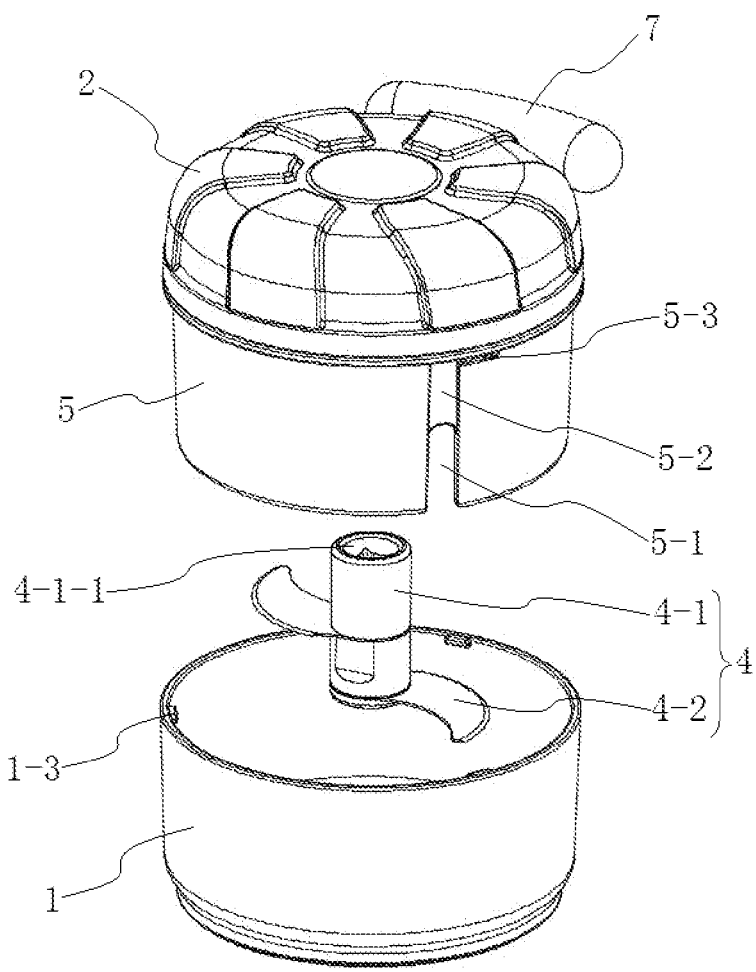
FIG. 3 is a schematic view showing a structure of the safe hand-pulled vegetable chopper of the present disclosure when components thereof are view separately.
Figure 4:
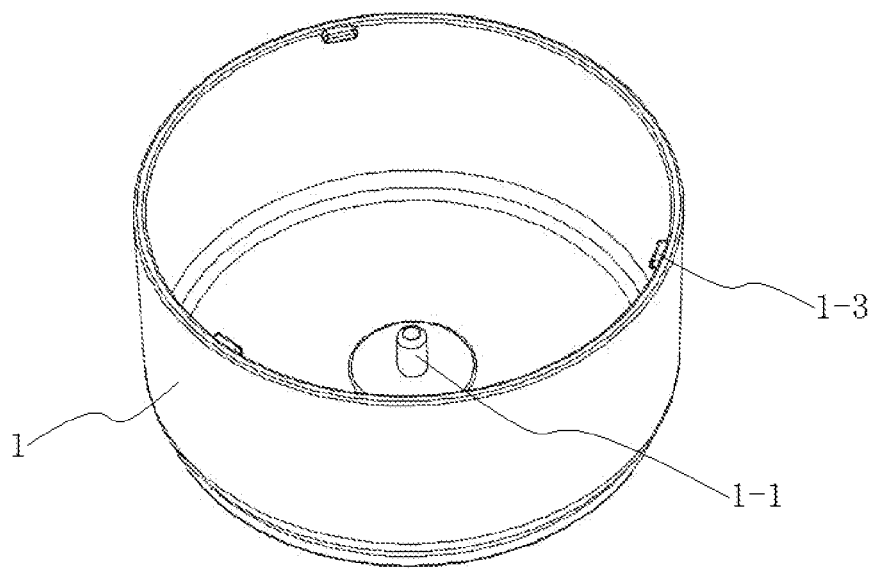
FIG. 4 is a schematic view showing a structure of a cup body in the safe hand-pulled vegetable chopper of the present disclosure.
Figure 5:
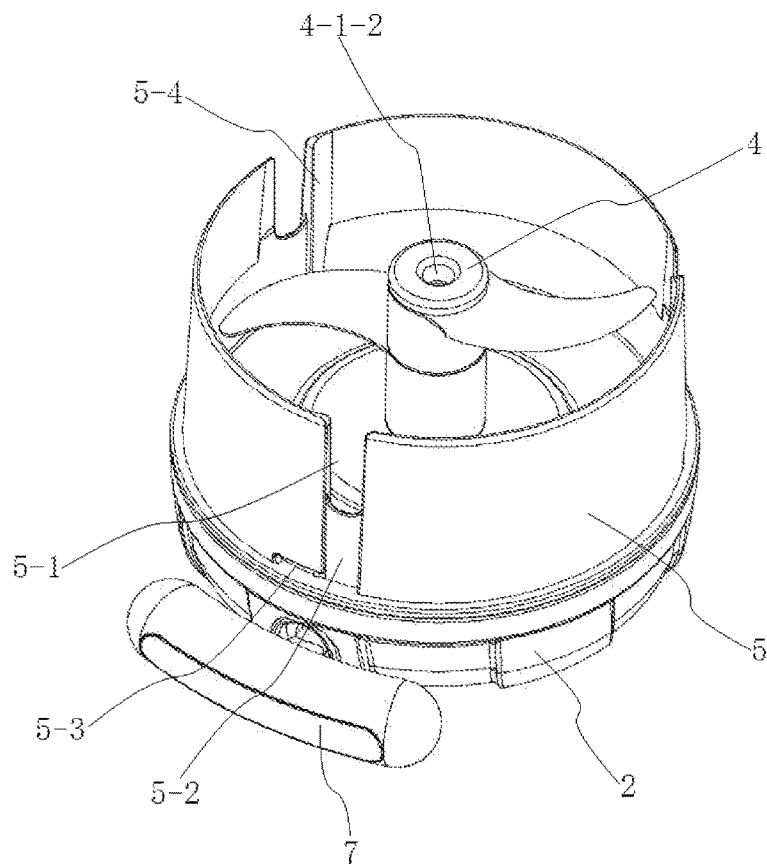
FIG. 5 is a schematic view showing a structure of a skirt-like enclosure of a lid in the safe hand-pulled vegetable chopper of the present disclosure.
Figure 6:
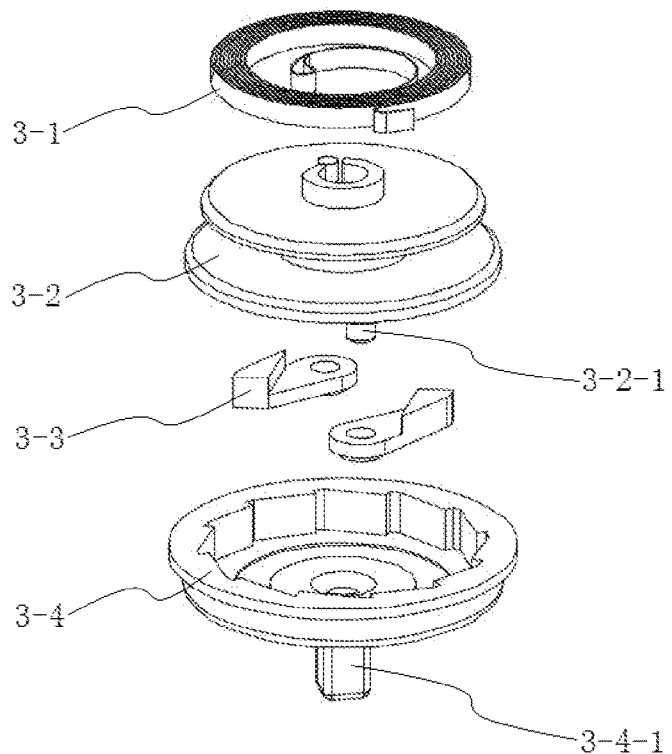
FIG. 6 is a schematic view showing a structure of a puller cord driving member in the safe hand-pulled vegetable chopper of the present disclosure when components thereof are view separately.

As shown in FIGS. 1 to 5, a safe hand-pulled vegetable chopper of the embodiment includes a cup body 1, a lid that matched with the cup body 1, a puller cord driving member 3 provided in the lid 2, and a blade assembly 4 in the cup body 1 and detachably connected to a driving end of the puller cord driving member 3. The puller cord driving member 3 is connected with the handle 7 through the puller cord, a user pulls the handle 7 to rotate the puller cord driving member 3 through the puller cord, and then the blade assembly 4 is rotated to chop the food in the cup body 1;

with a cord rewinding member and a one-way output member in the puller cord driving member 3, the user pulls the handle 7 repeatedly and then ingredients can be easily chopped into pieces. Different from the prior art, a circular skirt-like enclosure 5 is provided from a bottom of the lid 2 around an outer periphery of the blade assembly 4 to shield the blade assembly 4. The skirt-like enclosure 5 is within the cup body 1 when the cup body 1 and the lid 2 are engaged, the blade assembly 4 stays on the lid 2 when the cup body 1 and the lid 2 are separated. With the above-mentioned structural design, when the cup body 1 and the lid 2 are separated, the blade assembly 4 stays on the lid 2 and is shielded by the skirt-like enclosure 5. If the user has solid ingredients to be chopped, all that he/she has to do is to put the ingredients into the skirt-like enclosure 5 of the lid 2 and then close with the cup body 1; after the chopping is complete, the lid 2 is opened, the blade assembly 4 stays on the lid 2, and the ingredients in the cup body 1 can be directly taken out for use; when whipping up liquid ingredients such as eggs, all that the user has to do is to put the ingredients into the cup body 1 for whipping up; when cleaning, the user can simply rinse the cup body 1 and the lid 2 provided with the blade assembly 4, and then fill the cup body 1 with clean water and close the lid 2, shake and pull the handle 7 to clean the blade assembly 4, the cup body 1, and the lid 2. It can be seen from the above-mentioned process that the blade assembly 4 stays on one side of the lid 2 and is shielded by the skirt-like enclosure 5 after the vegetable chopper is opened, the user is less likely to contact the blade and the safety of the vegetable chopper is improved; the user can put solid ingredients directly into the interior of the lid 2 enclosed by the skirt-like enclosure 5, and then assemble the cup body 1 on the lid 2, without aligning the blade assembly 4 and the lid 2, which facilitates the assembling of the vegetable chopper, ensures the convenience and safety in the process of the vegetable chopping, and enables a flexible user experience and convenient rinse of the vegetable chopper. Besides, as shown in FIG. 5, to improve the efficiency of the vegetable chopper, a plurality of splines 5-4 are also provided on the inner side of the skirt-like enclosure 5. The use of the splines 5-4 effectively prevents the ingredients from rotating with the blade and improves the efficiency of the vegetable chopper. As shown in FIGS. 2 to 4, as a preferred embodiment, the skirt-like enclosure 5 is attached to the inner sidewall of the cup body 1, and the skirt-like enclosure 5 is provided with a plurality of notches 5-1 at intervals, and the notches 5-1 divide the skirt-like enclosure 5 into several tabs; with the above-mentioned notches 5-1, if the cup body 1 is transparent, to which a degree the ingredients are being chopped can be observed through the notches 5-1, and the convenience in use is improved; of course, the cup body 1 can also be designed to be translucent or opaque. To improve the anti-slip performance of the vegetable chopper, an anti-slip pad 1-2 is also provided at the bottom of the cup body 1. Preferably, the splines 5-4 are arranged on the same sides of opening walls of the notches 5-1 (shown in FIG. 5), which not only facilitates the forming of the splines 5-4 on the skirt-like enclosure 5, but reinforces the effect of stopping rotating along with the blades by the splines with the help of the opening walls of the notches, hence the efficiency of chopping is improved. Besides, the notch 5-1 is semi-closed by the stopper edge 5-2 at the top of the skirt-like enclosure, and the notch 5-1 is open at the bottom, as such, small-grain ingredients can be prevented from leaking out of the notch 5-1 when ingredients are fed into the skirt-like enclosure 5, and space can be reserved to observe to which a degree the ingredients are being chopped, thereby enabling a more flexible and convenient user experience. As shown in FIGS. 4 and 5, in this embodiment, preferably three groups of the notches 5-1 are uniformly arranged on the skirt-like enclosure 5. The cup body 1 and the lid 2 are rotated to engage. An outer sidewall of the skirt-like enclosure 5 is further provided with snap slots 5-3, and the inner sidewall of the cup body 1 is provided with snap fasteners 1-3 matched with the snap slots 5-3, and the snap fastener 1-3 is snapped into the snap slot 5-3 by rotating the skirt-like enclosure 5 relative to the cup body 1, as such, it's easy and convenient to assemble and disassemble the cup body 1 and the lid 2; also, three groups of the snap fasteners 1-3 and the snap slots 5-3 are provided correspondingly, which improves the stability of the engagement between the cup body 1 and the lid 2. Besides, in the safe hand-held vegetable chopper of this embodiment, the blade assembly 4 is magnetically attracted to the driving end of the puller cord driving member 3, so that the blade assembly 4 can stay on one side of the lid 2 when the vegetable chopper is opened. The chopped ingredients in the cup body 1 can be directly taken out for use without removing the blade assembly 4, and the blade assembly 4 is fixed magnetically, which facilitates the disassembling and assembling thereof and enables a quick replacement of the blade assembly 4. The blade assembly 4 in this embodiment includes a blade mount 4-1 and blades 4-2 mounted on the blade mount 4-1. The blade mount 4-1 can be specifically composed of three parts as shown in FIGS. 2 and 3, such a three-part configuration enables the mounting of two blades 4-2 and facilitates replacement of the blades. An upper end of the blade mount 4-1 is provided with a jack 4-1-1 for mating and in transmission connection with the driving end of the puller cord driving member 3, and the lower end of the blade mount 4-1 is provided with a positioning hole 4-1-2 for mating a positioning column 1-1 at the bottom of the cup body 1, which ensures that the blade mount 4-1 can be in stable transmission connection with the driving end of the puller cord driving member 3, so that the rotation of the blade assembly 4 is more stable and reliable. As shown in FIG. 2, the lid 2 in this embodiment includes an upper lid 2-1 and a lower lid 2-2 provided at a bottom of the upper lid 2-1. The upper lid 2-1 and the lower lid 2-2 are fixedly connected. A cavity is formed between the upper lid 2-1 and the lower lid 2-2, and the skirt-like enclosure 5 is integrally formed at a bottom of the lower lid 2-2 to facilitate the forming of the skirt-like enclosure 5. For the user to better grasp the vegetable chopper, anti-skid patterns can be designed on an outer surface of the upper lid 2-1. The specific structure of the puller cord driving member 3 in this embodiment is similar to that in the prior art, and the puller cord driving member 3 is installed in the cavity formed by the upper lid 2-1 and the lower lid 2-2. As shown in FIG. 6, the puller cord driving member 3 includes a torsion spring 3-1, a cord reel 3-2, pawls 3-3, and a ratchet gear wheel 3-4. The cord reel 3-2 is sleeved on a central column of the upper lid 2-1 and can rotate freely on the central column of the upper lid 2-1, the puller cord is provided in a middle cord groove of the cord reel 3-2, and one end of the puller cord is connected with the handle 7 provided on an outer side of the lid 2. An upper part of the cord reel 3-2 is provided with the torsion spring 3-1. An inner connecting end of the torsion spring 3-1 is connected to the cord reel 3-2, and an outer connecting end is connected to the upper lid 2-1. A lower part of the cord reel 3-2 is provided with the pawls 3-3. The pawls 3-3 are mounted on a mounting pin 3-2-1 at the bottom of the cord reel 3-2 and are matched with the ratchet gear wheel 3-4 on the lower lid 2-2, a circle of ratchet teeth is provided on an inner side of the ratchet gear wheel 3-4, the pawls 3-3 are unidirectionally geared with the ratchet gear wheel 3-4, and a connecting column 3-4-1 penetrating through the lower lid 2-2 is provided at a center of the ratchet gear wheel 3-4. When the handle 7 is pulled, the puller cord rotates the cord reel 3-2. At this time, the pawl 3-3 is geared with the ratchet gear wheel 3-4 to rotate the ratchet gear wheel 3-4, and then the connecting column 3-4-1 drives the blade assembly 4 to rotate to chop the ingredients, while the torsion spring 3-1 tightens; when the handle 7 is released, the torsion spring 3-1 is released to rotate the cord reel 3-2 in a reverse direction, and the puller cord is rewound into the cord groove, at this time, the pawl 3-3 disengages from the ratchet gear plate 3-4, and the ratchet gear plate 3-4 will not reverse with the cord reel 3-2; the user can pull the handle 7 back and forth to drive the blade assembly 4 to rotate unidirectionally and chop the ingredients. Of course, other similar unidirectional driving members can serve as the puller cord driving member 3. The above-mentioned connecting column 3-4-1 is provided with a magnetic block 6 for attracting a ferromagnetic component in the jack 4-1-1; for example, a magnet is embedded in the connecting column 3-4-1, screws are provided in the jack 4-1-1, and the blade assembly 4 is connected with the driving end of the cord drive member 3 through the attraction between the magnet and the screws; to increase the magnetic attraction, both the connecting column 3-4-1 and the jack 4-1-1 can be provided with a magnet; of course, it is also possible to provide a magnet in the jack 4-1-1 and embed an iron block in the connecting column 3-4-1. According to the safe hand-pulled vegetable chopper of this embodiment, the user can rotate the lid 2 counterclockwise to open the lid 2. At this time, the blade assembly 4 is connected to the lid 2. if the user has solid ingredients to chop, he/she can place the lid 2 upside down, put the ingredients directly into the skirt-like enclosure 5 of the lid 2, close with the cup body 1, and rotate the lid 2 in a reverse direction to engage the lid 2 and the cup body 1; after this, the user can hold the vegetable chopper with one hand, pull the handle 7 with the other hand to drive rotate the blade assembly 4 to quickly rotate and chop the ingredients. In the chopping process, the user can observe how the ingredients are being chopped through the transparent cup body 1 and the notch 5-1 on the skirt-like enclosure 5. When the chopping is finished, the user can open the lid 2 and gently shake the lid 2 to remove the residues of the ingredients from the blade assembly 4 and let them into the cup body 1. The chopped ingredients in the cup body 1 can be directly taken out for use. When cleaning, the user can simply rinse the cup body 1 and the lid 2 directly, leave a proper amount of water in the cup body 1, close the lid 2, and shake or pull the blade assembly 4 to rotate, then the blade assembly is cleaned; when whipping up liquid ingredients, the user can replace with an appropriate blade assembly 4 by simply removing the blade assembly 4 and installing the new blade assembly 4, put the ingredients into the cup body 1, and similarly, close the lid 2 and pull the handle 7 to drive the blade assembly 4 to rotate quickly and whip up the liquid ingredients.

According to the safe hand-pulled vegetable chopper of this embodiment, the blade assembly is detachably connected with the driving end of the puller cord driving member, and a circular skirt-like enclosure is provided from the bottom of the lid and around the outer periphery of the blade assembly to shield the blade assembly, as such, after the vegetable chopper is opened, the blade assembly stays on one side of the lid and is shielded by the skirt-like enclosure, the user is less likely to contact the blade, and the safety of the vegetable chopper is improved; besides, the user can directly place the solid ingredients into the interior of the lid enclosed by the skirt-like enclosure, and then assemble the cup body on the lid, so that it is more convenient to assemble the vegetable chopper, safer to operate because of the novel mode of usage, and easy to clean the vegetable chopper; besides, the blade assembly is attracted on the lid magnetically, which facilitates the assembling and disassembling of the blade assembly.

The above description of the present disclosure and the embodiments are given by way of illustration and not limitation; only one of the embodiments of the present disclosure is shown in the accompanying drawings and the actual structure is not limited thereto. Therefore, non-inventive structures and embodiments similar to the technical solution devised by those skilled in the art inspired by the present disclosure but without departing from the essentials herein shall fall within the scope of the present disclosure.

The invention claimed is:

1. A hand-pulled vegetable chopper, comprising:
   a cup body,
   a lid matched with the cup body,
   a puller cord driving member in the lid,
   a blade assembly in the cup body and detachably connected with a driving end of the puller cord driving member,
   a circular enclosure is provided from a bottom of the lid around an outer periphery of the blade assembly shielding the blade assembly, the circular enclosure is on an inner side of the cup body when the cup body engages the lid and the blade assembly stays on the lid when the cup body and the lid are separated, and
   a plurality of splines are provided on an inner side of the circular enclosure, wherein each of the plurality of splines includes a free end away from the inner side of the circular enclosure and extending toward the blade assembly;
   wherein the circular enclosure is attached to an inner sidewall of the cup body, and a plurality of notches are provided on the circular enclosure at intervals;
   wherein the splines are arranged on the same sides of opening walls of the notches, and each notch is semi-closed by a stopper edge at a top.

2. The hand-pulled vegetable chopper according to claim 1, wherein snap slots are further provided on an outer sidewall of the circular enclosure, snap fasteners matched with the snap slots are provided on the inner sidewall of the cup body, and the snap fastener is snapped into the snap slot by rotating the circular enclosure relative to the cup body.

3. The hand-pulled vegetable chopper according to claim 1, wherein the blade assembly and the driving end of the puller cord driving member are made of a magnetically attractable material, and the blade assembly is attached to the driving end of the puller cord driving member.

4. The hand-pulled vegetable chopper according to claim 3, wherein the blade assembly comprises a blade mount and blades mounted on the blade mount, an upper end of the blade mount is provided with a jack for a plug-in transmission connection with the driving end of the puller cord driving member, and a lower end of the blade mount is provided with a positioning hole to cooperate with a positioning column at a bottom of the cup body.

5. The hand-pulled vegetable chopper according to claim 4, wherein the lid comprises an upper lid and a lower lid at a bottom of the upper lid, and the circular enclosure is connected at a bottom of the lower lid.

6. The hand-pulled vegetable chopper according to claim 5, wherein the puller cord driving member is provided in a cavity formed by the upper lid and the lower lid, and comprises a torsion spring, a cord reel, pawls and, a ratchet gear wheel; the cord reel is sleeved on a central column of the upper lid, a puller cord is provided in a middle cord groove of the cord reel, one end of the puller cord is connected to a handle on an outer side of the lid, the torsion spring is disposed at an upper part of the cord reel, the pawls are disposed at a lower part of the cord reel, the pawls are matched with the ratchet gear disc arranged on the lower lid, and a connecting column penetrating through the lower lid is provided in a center of the ratchet gear wheel.

7. The hand-pulled vegetable chopper according to claim 6, wherein the connecting column is internally provided with a magnetic block for attracting a ferromagnetic component in the jack.

* * * * *